US012651266B2

(12) United States Patent
Nadav

(10) Patent No.: US 12,651,266 B2
(45) Date of Patent: Jun. 9, 2026

(54) SYSTEMS AND METHODS FOR RANKING CALL INTENT PROBABILITY

(71) Applicant: Wells Fargo Bank, N.A., San Francisco, CA (US)

(72) Inventor: Carmel Nadav, Eagan, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 173 days.

(21) Appl. No.: 18/587,125

(22) Filed: Feb. 26, 2024

(65) Prior Publication Data

US 2025/0272694 A1     Aug. 28, 2025

(51) Int. Cl.
     *G06Q 30/015*          (2023.01)
(52) U.S. Cl.
     CPC .................................. *G06Q 30/015* (2023.01)
(58) Field of Classification Search
     CPC .................................................... G06Q 30/015
     See application file for complete search history.

(56) References Cited

U.S. PATENT DOCUMENTS

| | | | | |
|---|---|---|---|---|
| 9,703,871 | B1* | 7/2017 | Das ...................... | G06F 16/3338 |
| 2009/0279683 | A1* | 11/2009 | Gisby .................... | H04M 3/465 |
| | | | | 379/211.01 |
| 2014/0089302 | A1* | 3/2014 | Lapir ................ | G06F 16/90344 |
| | | | | 707/723 |

| | | | | |
|---|---|---|---|---|
| 2015/0312195 | A1* | 10/2015 | Mehr .................... | H04L 51/216 |
| | | | | 709/206 |
| 2016/0212273 | A1* | 7/2016 | Tsypnyatov .......... | H04M 3/562 |
| 2018/0082213 | A1 | 3/2018 | McCord | |
| 2018/0121766 | A1 | 5/2018 | McCord | |
| 2024/0386883 | A1* | 11/2024 | Darla .................... | G06F 40/216 |
| 2025/0111145 | A1* | 4/2025 | Londner ................ | G06F 40/30 |

OTHER PUBLICATIONS

Long et al., "CRSRL: Customer Routing System Using Reinforcement Learning", Proceedings of the Twenty-Eighth International Joint Conference on Artificial Intelligence (IJCAI-19), Retrieved from https://www.ijcai.org/proceedings/2019/0952.pdf, Aug. 1, 2019 (3 pages).

* cited by examiner

*Primary Examiner* — Richemond Dorvil
*Assistant Examiner* — Adam Michael Weaver
(74) *Attorney, Agent, or Firm* — K&L Gates LLP

(57)                    ABSTRACT

Systems, apparatuses, methods, and computer program products are disclosed for deriving call intent probability. An example method includes receiving a set of call menu tokens and creating an n-gram from the set of call menu tokens. The example method further includes receiving an intent call log for a candidate call intent, which includes a frequency of the n-gram and a total frequency, and determining, by scoring circuitry, an n-gram intent score based on the frequency of the n-gram and the total frequency of the intent call log. The example method further includes determining a total score for the candidate call intent based on the n-gram intent score, where the total score provides a measure of a probability of the candidate call intent and outputting a ranked list of call intents comprising the total score and the candidate call intent.

20 Claims, 6 Drawing Sheets

100

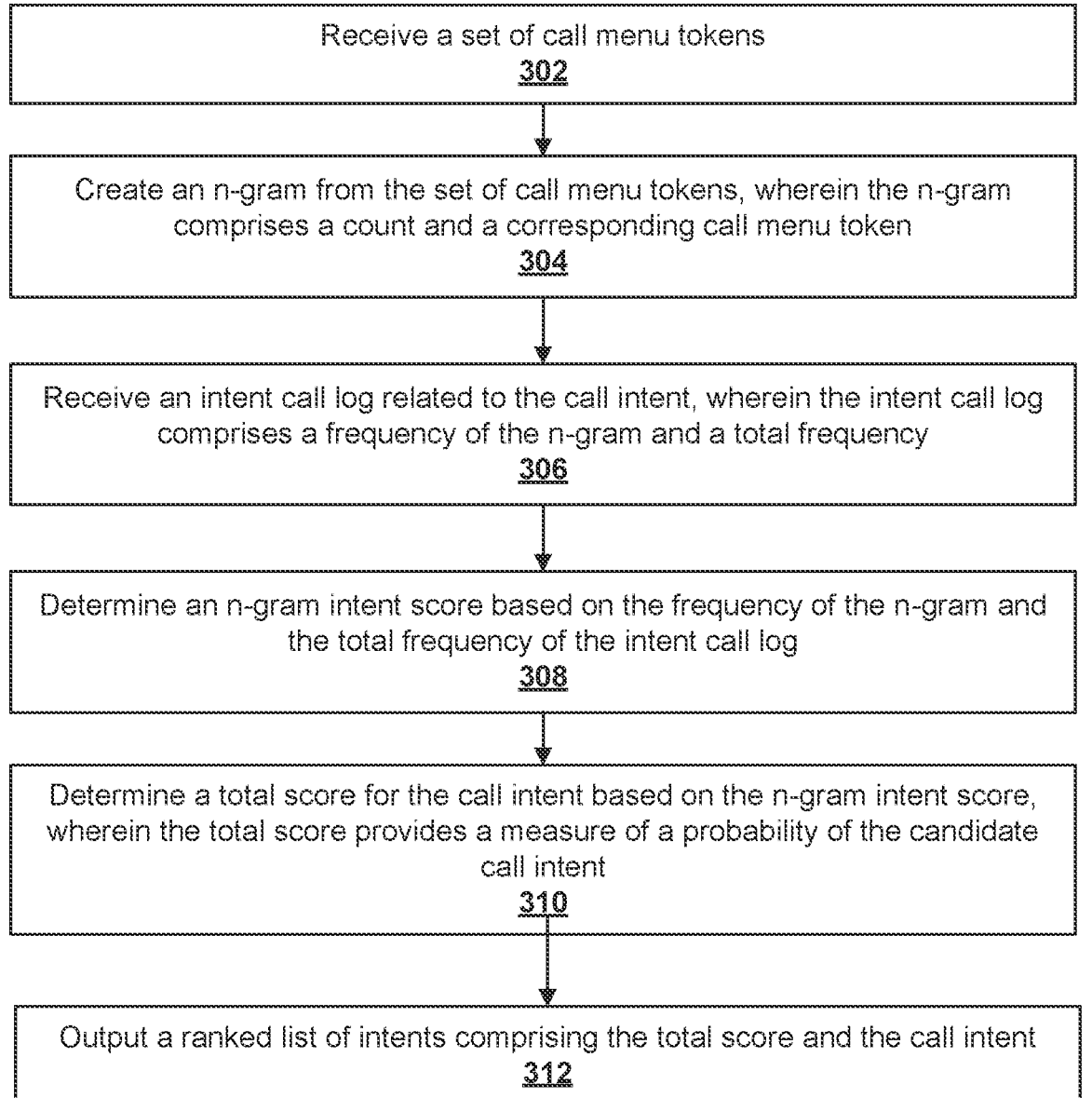

Receive a set of call menu tokens
302

Create an n-gram from the set of call menu tokens, wherein the n-gram comprises a count and a corresponding call menu token
304

Receive an intent call log related to the call intent, wherein the intent call log comprises a frequency of the n-gram and a total frequency
306

Determine an n-gram intent score based on the frequency of the n-gram and the total frequency of the intent call log
308

Determine a total score for the call intent based on the n-gram intent score, wherein the total score provides a measure of a probability of the candidate call intent
310

Output a ranked list of intents comprising the total score and the call intent
312

FIG. 3

SYSTEMS AND METHODS FOR RANKING CALL INTENT PROBABILITY

BACKGROUND

Determining the intent of a caller and distributing calls to the appropriate destinations is an important function for providing cost-effective customer service via telephone. Interactive voice response (IVR) systems allow customers to interact with call menus by playing pre-recorded messages and accepting commands via speech recognition. In some instances, IVR systems may issue an open-ended prompt to the caller, who may respond with a short command indicating the caller's intent.

BRIEF SUMMARY

Computer systems for interacting with telephone callers are used increasingly to provide an interface for interactive voice response (IVR) systems, and are widely used in airline reservations, bank customer account lines, utilities, credit card companies, and the like. Users may be presented with a hierarchical call menu of prompts which may be navigated by providing voice commands or dial tone (dual tone multifrequency, or DTMF) inputs, which cause the user to navigate to different levels of the call menu.

Existing IVR systems frequently cause frustration among users due to the static nature of the hierarchical call menu, the requirement of listening to a long pre-recorded message, and/or difficulties with voice recognition of a limited number of voice commands. Users must access a particular call system several times to gain experience navigating the system in order to navigate efficiently through the call menu. To this end, newer generation call systems may attempt to incorporate artificial intelligence (AI) or other machine learning techniques to improve the standard call systems. However, AI brings a new set of setbacks and limitations. Call systems typically handle immense volumes of calls every day, and need to act in predictable and understandable ways that are difficult to implement with AI. AI systems may also require significant costs in terms of computation time to train and deploy trained models compared to a more elegant solution. Considering the large call volumes handled every day, even a small change in computation requirements becomes significant very quickly. AI models may also need to be re-trained and validated when moved to new contexts, such as new call centers or interfaced with new systems, incurring additional costs. Finally, AI models involve additional costs and requirements for validation, quality control, regulatory requirements, and the like.

In contrast to these techniques for call routing, example embodiments described herein use a lightweight, model-free approach the fast and flexible processing of call intents. Intents are chosen based on token strings extracted from a call log, which are used to construct n-grams and determine scores based on the frequency with which the same n-grams appear in historical call logs. Instances of a string appearing multiple times in the same call (e.g., a 2-gram or 3-gram, etc.) may contribute relatively larger scores owing to their relative rarity compared with 1-grams.

Accordingly, the present disclosure sets forth systems, methods, and apparatuses that provide a most probable call intent for a call log. There are many advantages of these and other embodiments described herein. For instance, the lightweight nature of example embodiments disclosed herein provides faster processing times than other comparable approaches. Due to the very large volume that call centers typically receive, even small differences in computation cost for call routing may amount to large overall differences in cost. Furthermore, a lightweight algorithm as disclosed herein is able to be executed substantially simultaneously with the receipt of call data, unlocking the potential for real time responses to caller queries. In addition, example embodiments disclosed herein are model-free, avoiding a complex statistical model or machine learning algorithm. The model-free approach simplifies quality control, troubleshooting, and reporting for regulatory and/or internal requirements.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3 illustrates an example flowchart for determining call intent probability, in accordance with some example embodiments described herein.

DETAILED DESCRIPTION

Figure 1:
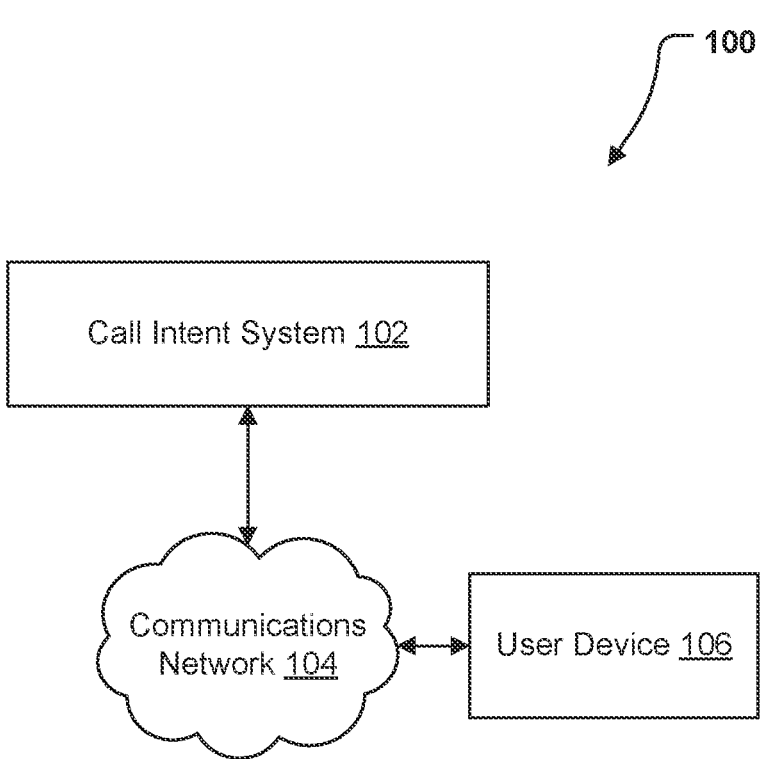
FIG. 1 illustrates a system in which some example embodiments may be used for determining call intent probability.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "call menu token" refers to a data structure typically represented as a string, wherein each call menu token in a set of call menu tokens may not necessarily be unique. A set of call menu tokens may be collected by parsing a user's voice commands when accessing an IVR or similar system. For example, a caller may say "deposit," "account," "deposit," "operator" during a call, generating the four call menu tokens shown. It will be understood that the call menu tokens may be parsed and collected using any methods known in the art, and for the purposes of the present disclosure, the call menu tokens are parsed and prepared for analysis when received. As noted previously, call menu tokens may not be unique and a particular call menu token may be repeated more than once within the set of call menu tokens.

The term "n-gram" refers to a data structure that may include a call menu token and a count, which represents the frequency with which the call menu token appears in the set of call menu tokens described above. For example, the set of call menu tokens "deposit," "account," "deposit," "operator" may generate the n-grams "deposit: 2", "account: 1", and "operator: 1." In some embodiments, call menu tokens not appearing in the set of call menu tokens may be understood to be n-grams with a count of zero.

The term "call intent" refers to an entity which may describe a desired outcome for a caller accessing an IVR or other call system. For example, the possible call intents may be the final destinations to which the IVR system is configured to route callers. In some embodiments, call intents may be more numerous than the IVR system routing destinations. For example, intents such as "make a deposit" and "receive balance statement" may both route to the same call destination, but may be distinct call intents. The call intent may be represented in any data format known in the art, such as a text string indicating the name of the intent, and may be accompanied by other metadata or linked data in any data structure known in the art.

System Architecture

Example embodiments described herein may be implemented using any of a variety of computing devices or servers. To this end, FIG. 1 illustrates an example environment 100 within which various embodiments may operate. As illustrated, an call intent system 102 may receive and/or transmit information via communications network 104 (e.g., the Internet) with any number of other devices, such as a user device 106.

The call intent system 102 may be implemented as one or more computing devices or servers, which may be composed of a series of components. Particular components of the call intent system 102 are described in greater detail below with reference to apparatus 200 in connection with FIG. 2.

The user device 106 may be embodied by any computing devices known in the art. The user device 106 need not itself be an independent device, but may comprise one or more peripheral devices communicatively coupled to other computing devices.

Example Implementing Apparatuses

Figure 2:
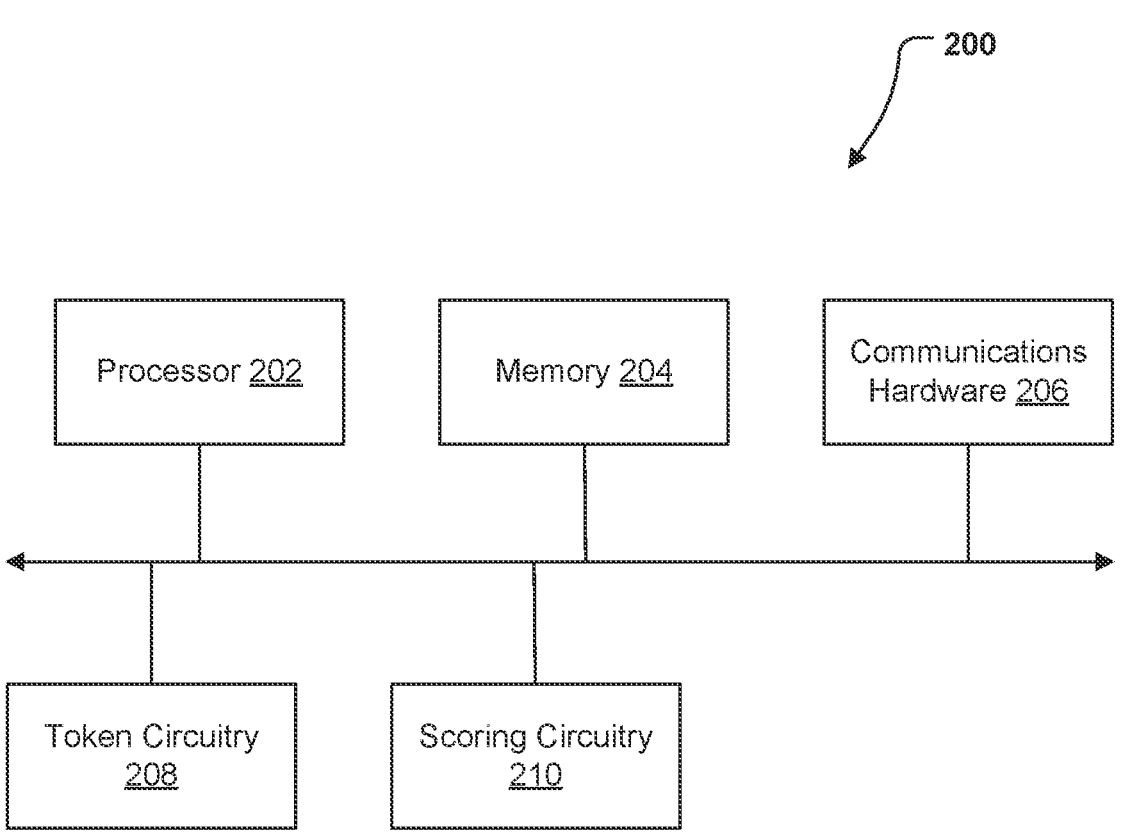
FIG. 2 illustrates a schematic block diagram of example circuitry embodying a system device that may perform various operations in accordance with some example embodiments described herein.

The call intent system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-6. As illustrated in FIG. 2, the apparatus 200 may include processor 202, memory 204, communications hardware 206, token circuitry 208, and scoring circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a token circuitry 208 that creates an n-gram from a set of call menu tokens. The token circuitry 208 may utilize processor 202, memory 204, or any other hardware component included in the apparatus 200 to perform these operations, as described in connection with FIGS. 3-6 below. The token circuitry 208 may further utilize communications hardware 206 to gather data from a variety of sources (e.g., user device 106, as shown in FIG. 1), and/or exchange data with a user, and in some embodiments may utilize processor 202 and/or memory 204 to create n-grams.

In addition, the apparatus 200 further comprises a scoring circuitry 210 that determining an n-gram intent score and a total score. The scoring circuitry 210 may utilize processor 202, memory 204, or any other hardware component included in the apparatus 200 to perform these operations, as described in connection with FIGS. 3-6 below. The scoring circuitry 210 may further utilize communications hardware 206 to gather data from a variety of sources (e.g., user device 106, as shown in FIG. 1), and/or exchange data with a user, and in some embodiments may utilize processor 202 and/or memory 204 to determine n-gram scores and total scores.

Although components 202-210 are described in part using functional language, it will be understood that the particular implementations necessarily include the use of particular hardware. It should also be understood that certain of these components 202-210 may include similar or common hardware. For example, the token circuitry 208 and scoring circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the token circuitry 208 and scoring circuitry 210 may leverage processor 202, memory 204, or communications hardware 206 as described above, it will be understood that any of token circuitry 208 and scoring circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that token circuitry 208 and scoring circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Turning to FIGS. 3-6, example flowcharts are illustrated that contain example operations implemented by example embodiments described herein. The operations illustrated in FIGS. 3-6 may, for example, be performed by the call intent system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, token circuitry 208, scoring circuitry 210, and/or any combination thereof. It will be understood that user interaction with the call intent system 102 may occur directly via communications hardware 206, or may instead be facilitated by a separate user device 106, as shown in FIG. 1, and which may have similar or equivalent physical componentry facilitating such user interaction.

Turning first to FIG. 3, example operations are shown for deriving call intent probability. As shown by operation 302, the apparatus 200 includes means, such as processor 202, memory 204, communications hardware 206, or the like, for receiving a set of call menu tokens. The communications hardware 206 may receive the set of call menu tokens from a remote server or any other device via communications network 104 using network hardware, firmware, and/or software of the communications hardware 206. In some embodiments, the communications hardware 206 may retrieve the set of call menu tokens from remote storage via a communications network 104. In some embodiments, the set of call menu tokens may be stored using memory 204 or other storage, and may be retrieved during operation 302.

The set of call menu tokens may be a collection of strings, wherein each call menu token may not necessarily be unique. The set of call menu tokens may be collected by parsing a user's voice commands when accessing an automated call distribution (ACD) with interactive voice response (IVR) or similar system. For example, a caller may say "deposit," "account," "deposit," "operator" during a call, generating the four call menu tokens shown. It will be understood that the call menu tokens may be parsed and collected using any methods known in the art, and for the purposes of the present disclosure, the call menu tokens are parsed and prepared for analysis when received. As noted previously, call menu tokens need not be unique and a particular call menu token may be repeated more than once within the set of call menu tokens.

The call menu tokens may be received using any data structure known in the art, including binary data or plain text data, and the set of call menu tokens may be formatted using any data types known in the art. For example, the set of call menu tokens may be received as a JSON file including a list of strings, where each call menu token is represented as a string. In some embodiments, additional data such as the context within an IVR system, the timestamp of each call menu token, confidence level for interpreting the call menu token from voice data, and/or the like may also be included with the set of call menu tokens. The communications hardware 206 and/or processor 202 may extract the call menu tokens from the data received to pass the set of call menu tokens to the token circuitry 208 for subsequent processing.

As shown by operation 304, the apparatus 200 includes means, such as processor 202, memory 204, token circuitry 208, or the like, for creating an n-gram from the set of call menu tokens, wherein the n-gram comprises a count and a corresponding call menu token. Although the apparatus 200 may create at least one n-gram, the token circuitry 208 may in many cases create more than one n-gram. To do this, the token circuitry 208 may use the set of call menu tokens to create a list of n-grams. Each created n-gram may include a call menu token and a count, which represents the frequency with which the call menu token appears in the set of call menu tokens received during operation 302. For example, the set of call menu tokens "deposit," "account," "deposit," "operator" may generate the n-grams "deposit: 2", "account: 1", and "operator: 1." In some embodiments, call menu tokens not appearing in the set of call menu tokens may be understood to be n-grams with a count of zero.

The n-grams may be created and stored using any data structure known in the art, including binary data or plain text data, and the n-grams may be formatted using any data types known in the art. For example, the n-grams may be created as a JSON file including a list of strings and integers, where each n-gram is represented as a string and a corresponding integer. In some embodiments, additional metadata may be included with the n-gram.

As shown by operation 306, the apparatus 200 includes means, such as processor 202, memory 204, communications hardware 206, or the like, for receiving an intent call log for a candidate call intent, wherein the intent call log comprises a frequency of the n-gram and a total frequency.

The communications hardware 206 may receive the intent call log from a remote server or any other device via communications network 104 using network hardware, firmware, and/or software of the communications hardware 206. In some embodiments, the communications hardware 206 may retrieve the intent call log from remote storage via a communications network 104. In some embodiments, the intent call log may be stored using memory 204 or other storage, and may be retrieved during operation 302.

The intent call log may be related to a candidate call intent. A call intent may describe a desired outcome for a caller accessing an IVR system. For example, the possible call intents may be the final destinations to which the IVR system is configured to route callers. In some embodiments, call intents may be more numerous than the IVR system routing destinations. For example, intents such as "make a deposit" and "receive balance statement" may both route to the same call destination, but may be distinct call intents. Call intents may be represented in any data format known in the art, such as a text string indicating the name of the intent, and may be accompanied by other metadata or linked data in any data structure known in the art.

The intent call log may be related to the candidate call intent by comprising historical data of call menu tokens for call related to the candidate call intent. For example, a logged call in an IVR system that successfully resolves a caller's desired intent for "make a deposit" and is directed to the correct intent may be stored and associated with the candidate call intent "make a deposit." In some embodiments, the intent call log may be organized as a set of n-grams related to a candidate call intent. For example, a single logged call entry may be represented as "'make a deposit': ['deposit: 2', 'account: 1', 'operator: 1']" indicating the call menu token and count of each call menu token for the call.

In some embodiments, individual calls may be aggregated to give frequencies for a large number of calls, for example, "'make a deposit': ['deposit:2:1987151', 'deposit: 1:1204878', 'account: 1:874123', 'operator: 2:14481', 'operator: 1:654891']" for a log comprising millions of calls. In this example, callers mentioned the word "deposit" twice in 1,987,151 calls, mentioned "deposit" once in 1,204, 878 calls, and so on. As shown, each n-gram may include a call menu token and a count, and each n-gram may include a total frequency found in the call intent logs. The call intent log may include a total frequency of n-grams, is the total number of calls in the call intent logs with the relevant intent. Note that some calls may have multiple intents and multiple n-grams, so the sum of frequencies is not necessarily equal to the total frequency.

As shown by operation 308, the apparatus 200 includes means, such as processor 202, memory 204, communications hardware 206, scoring circuitry 210, or the like, for determining an n-gram intent score based on the frequency of the n-gram and the total frequency of the intent call log. The scoring circuitry 210 may compute the n-gram intent score using data received during operation 302 and/or operation 306. Example details for determining the n-gram intent score are given below in connection with FIG. 4.

Figure 4:
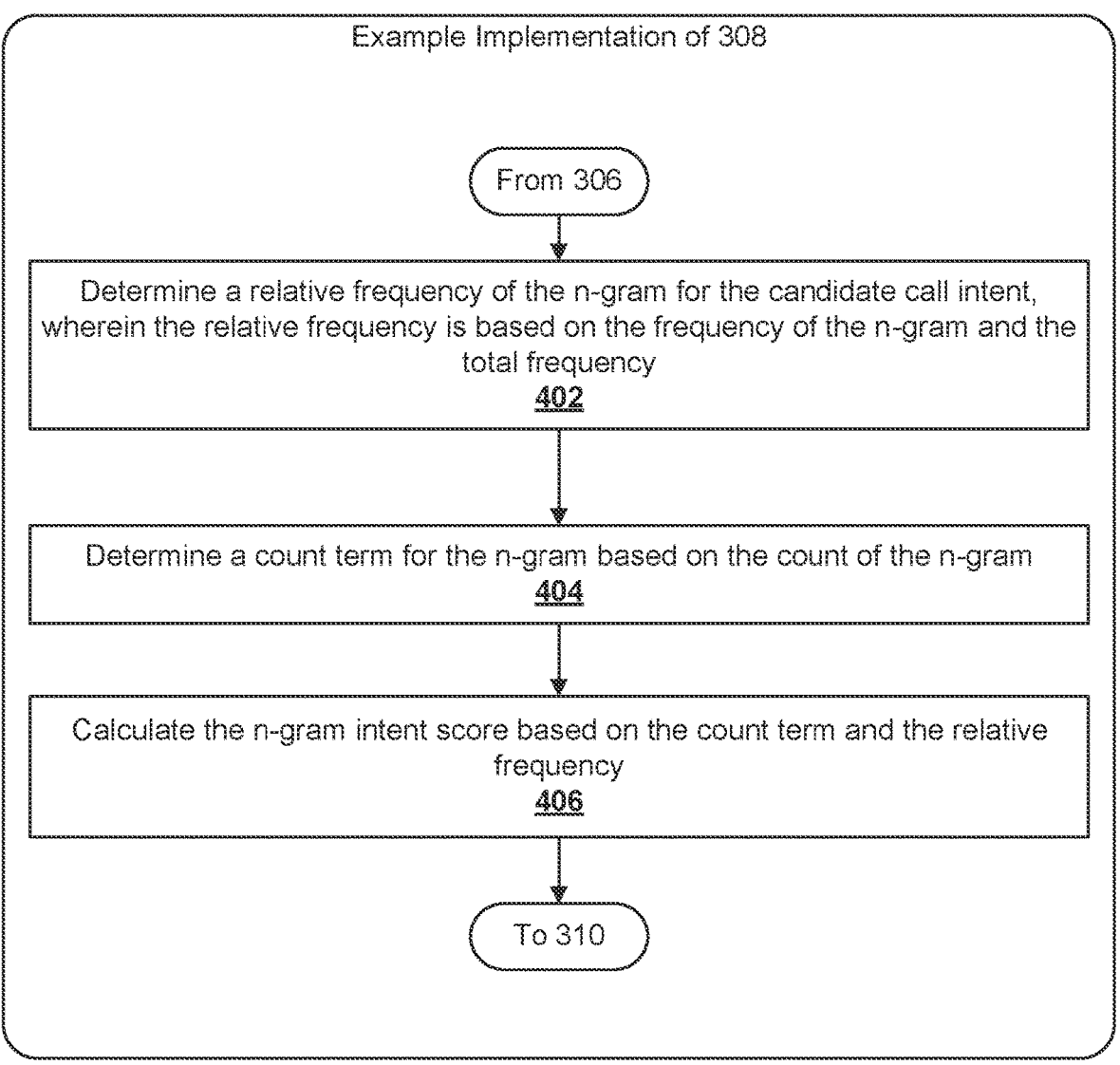
FIG. 4 illustrates an example flowchart for determining an n-gram intent score, in accordance with some example embodiments described herein.

In some embodiments, operation 308 may be performed in accordance with the operations described by FIG. 4. Turning now to FIG. 4, example operations are shown for determining an n-gram intent score based on the frequency of the n-gram and the total frequency of the intent call log.

As shown by operation 402, the apparatus 200 includes means, such as processor 202, memory 204, communications hardware 206, token circuitry 208, scoring circuitry 210, or the like, for determining, by the scoring circuitry, a relative frequency of the n-gram for the candidate call intent, wherein the relative frequency is based on the frequency of the n-gram and the total frequency. The relative frequency may be computed from a formula using at least the frequency of the n-gram and the total frequency appearing in the relevant intent call log. In a simple example, the relative frequency may be the frequency of the n-gram divided by the total frequency (the number of all calls in the call intent log).

As shown by operation 404, the apparatus 200 includes means, such as processor 202, memory 204, communications hardware 206, token circuitry 208, scoring circuitry 210, or the like, for determining, by the scoring circuitry, a count term for the n-gram based on the count of the n-gram. As described previously, the count of the n-gram is the number of times the call menu token appears in a particular call log for an individual call. For example, if a customer mentions the word "deposit" twice during a call, a relevant n-gram for "deposit" has a count of two. In some embodiments, a count term may be applied to the score calculation to more strongly weight n-grams with higher counts. An n-gram with a count larger than one may have a lower frequency, but may be more strongly indicative of a call intent. For example, mentioning a word more than three times may provide a strong indication of the call intent, but may be relatively rare in the call logs and therefore have a low relative frequency. By applying a correction through a count term, mentioning a word more than three times in a call may provide a larger contribution to the score calculation.

As shown by operation 406, the apparatus 200 includes means, such as processor 202, memory 204, communications hardware 206, token circuitry 208, scoring circuitry 210, or the like, for calculating, by the scoring circuitry, the n-gram intent score based on at least the count term. In some embodiments, the n-gram intent score may be represented by the formula:

$$\text{Score}=\Psi(\Gamma(X_i),\Delta(Y_i),Y(Z))$$

where $X_i$ is a subset of n-grams of size i, $Y_i$ is the frequency or number of calls for the n-gram, and Z is the total frequency, or the number of all calls with the candidate intent in the call logs. The functions $\Psi$, $\Gamma$, $\Delta$, and Y may take any form, and may include various configurable parameters. In some embodiments, the functions $\Psi$, $\Gamma$, $\Delta$, and Y may include trainable or fitted parameters that may be adjusted based on historic call log data. As described previously, the n-gram intent score may be based on the count term and the relative frequency, as indicated by the functional form given above, however it will be understood that other functional forms that include the count term and relative frequency may also be included.

Returning now to FIG. 3, operation 310 illustrates that the apparatus 200 includes means, such as processor 202, memory 204, scoring circuitry 210, or the like, for determining a total score for the candidate call intent based on the n-gram intent score, wherein the total score provides a measure of a probability of the candidate call intent. Example implementing details of operation 310 are described below in connection with FIG. 5.

Figure 5:
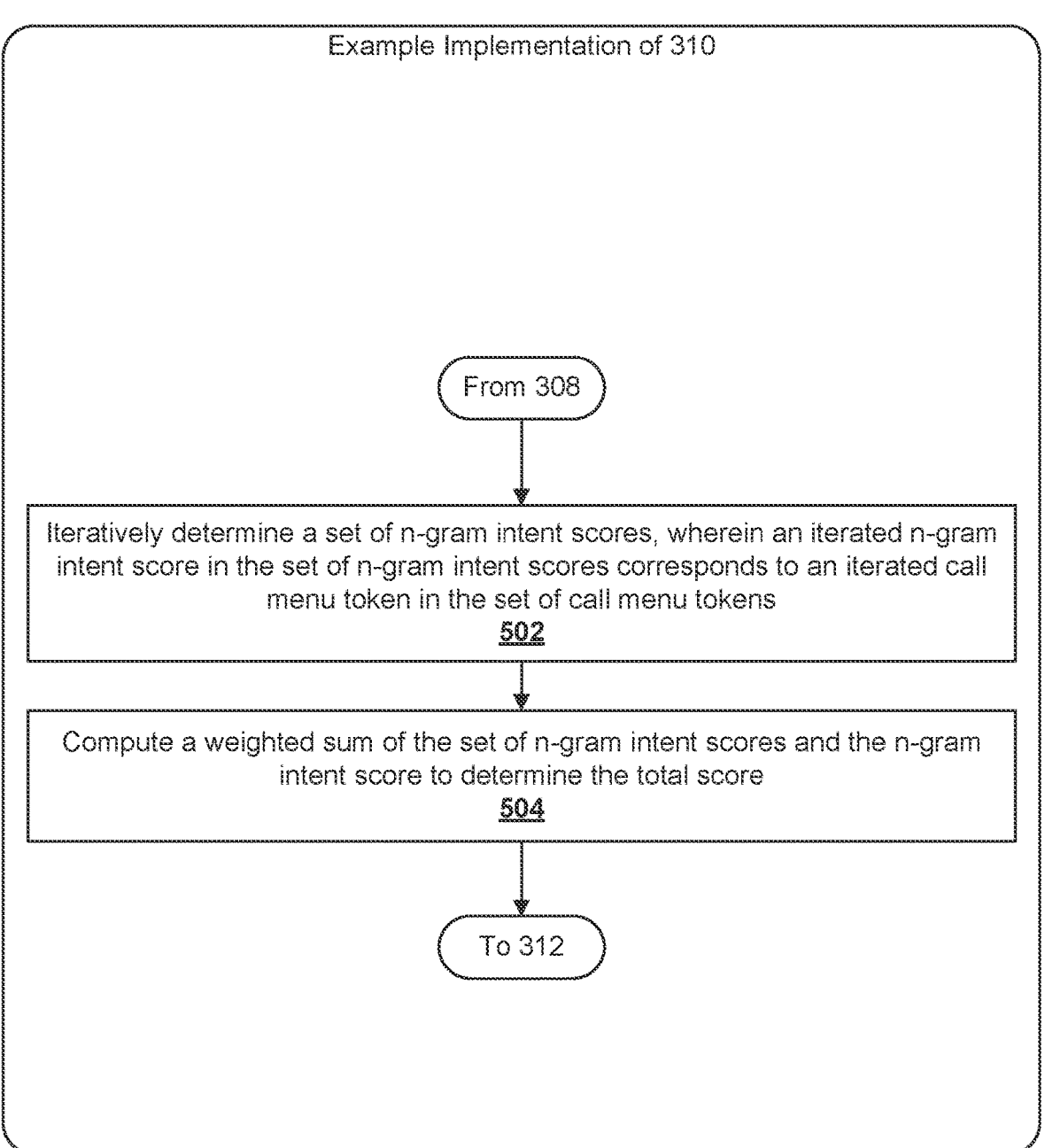
FIG. 5 illustrates an example flowchart for determining a total score for a call intent, in accordance with some example embodiments described herein.

Turning now to FIG. 5, example operations are shown for determining a total score for the call intent based on the n-gram intent score.

As shown by operation 502, the apparatus 200 includes means, such as processor 202, memory 204, communications hardware 206, token circuitry 208, scoring circuitry 210, or the like, for iteratively determining a set of n-gram intent scores, wherein an iterated n-gram intent score in the set of n-gram intent scores corresponds to an iterated call menu token in the set of call menu tokens. In some embodiments, the operations described in FIG. 3, in particular operation 306 through operation 308, may be performed iteratively to determine a set of n-gram intent scores. For example, the set of call menu tokens received in operation 302 may be used to determine a set of n-grams by iterating through iterated call menu tokens in the set of call menu tokens. The n-gram intent score for each n-gram determined from the set of call menu tokens may be determined iteratively, and the n-gram intent scores may be used together to determine the total score. Although the number of call menu tokens may be greater than the number of n-grams (since a call menu token may be repeated), the iteration may be performed after determining the set of n-gram tokens from the set of call menu tokens (as described above in connection with operation 304). Although operation 306 through operation 308 may be iterated, in some embodiments, certain operations may be performed once and cached for all n-grams prior to iteration.

As shown by operation 504, the apparatus 200 includes means, such as processor 202, memory 204, communications hardware 206, scoring circuitry 210, or the like, for computing a weighted sum of the set of n-gram intent scores and the n-gram intent score to determine the total score. The scoring circuitry 210 may compute the total score using each of the n-gram intent scores (e.g., the n-gram intent scores from the set of n-gram intent scores and the n-gram intent score that may be computed in operation 308).

The total score may depend on each of the determined n-gram scores using any formula that provides the total score as output. For example, the n-gram scores may simply be summed together to determine the total score. In some embodiments, various corrections, weights, or other factors may be included when computing the total score. For example, n-grams intent scores from certain n-grams may be given lower weights by hand to reduce unwanted effects, such as commonly misheard call menu tokens or the like.

Finally, returning to FIG. 3, as shown by operation 312, the apparatus 200 includes means, such as processor 202, memory 204, communications hardware 206, or the like, for outputting a ranked list of call intents comprising the total score and the candidate call intent. The communications hardware 206 may output the ranked list using any attached output hardware, or may transmit the ranked list to a remote device using communications network 104. In some embodiments, the ranked list may be transmitted to an IVR server or related server that may use the ranked list to create a new call menu for a call in progress.

The ranked list of call intents may include the call intent and total score obtained from operation 302 through operation 310. In some embodiments, the processor 202, token circuitry 208, scoring circuitry 210, or the like may iterate through the list of intents, providing a set of call intents with corresponding total scores (e.g., as described below in connection with operation 602. The scoring circuitry 210 may rank the call intents from the set of call intents according to their corresponding total scores to create the ranked list of call intents. In some embodiments, the call intent and total score may be inserted into an existing list of call intents and total scores.

Figure 6:
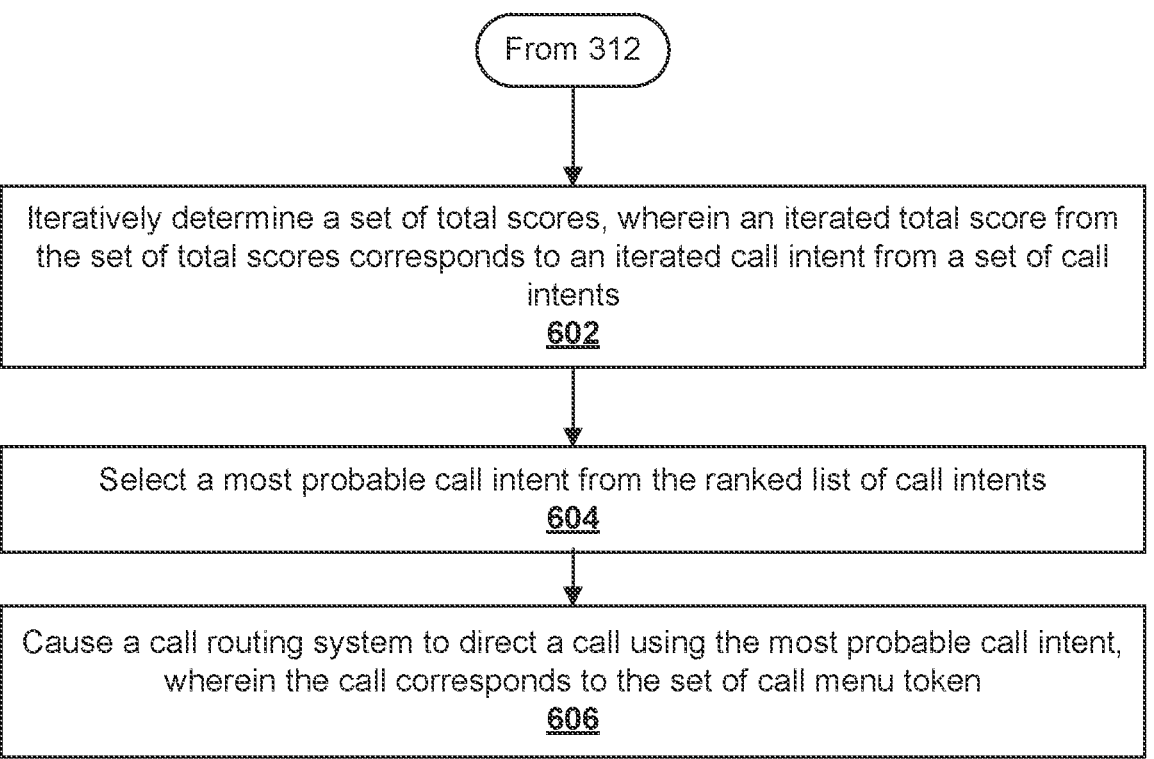
FIG. 6 illustrates an example flowchart for determining and routing a call to the most probably call intent, in accordance with some example embodiments described herein.

Turning now to FIG. 6, example operations are shown for determining and routing a call to the most probably call intent. As shown by operation 602, the apparatus 200 includes means, such as processor 202, memory 204, token circuitry 208, scoring circuitry 210, or the like, for iteratively determining a set of total scores, wherein an iterated total score in the set of total scores corresponds to an iterated call intent in a set of call intents. The set of call intents may be pre-determined during configuration of the call intent system 102. For example, the list of intents may correspond to the set of call destinations implemented in an IVR system. The apparatus 200 and component circuitry may iterate through operation 302 to operation 312 for each of the call intents in the set of call intents, designating one of the call intents as the candidate call intent for the current iteration. The total scores determined during operation 310 may be added to the set of total scores, which may each be considered during operation 312 when generating the ranked list of call intents.

As shown by operation 604, the apparatus 200 includes means, such as processor 202, memory 204, communications hardware 206, or the like, for selecting a most probable call intent from the ranked list of call intents. The processor 202 may select the most probable call intent from the ranked list of call intents by selecting the call intent corresponding to the greatest total score. In some embodiments, the processor 202 may select a fallback intent for instances in which an error state occurs, no call intents with total scores are available, and/or the like.

As shown by operation 606, the apparatus 200 includes means, such as processor 202, memory 204, communications hardware 206, or the like, for causing a call routing system to direct a call using the most probable call intent, wherein the call corresponds to the set of call menu tokens. The communications hardware 206 may transmit an indication of the most probable call intent to a call routing system (e.g., an IVR system). By transmitting the indication of the most probable call intent together with instructions to the system, the apparatus 200 may cause the call routing system to direct an active call to a destination corresponding to the most probable call intent.

In some embodiments, causing the call routing system to direct the call occurs substantially simultaneously with receiving the set of call menu tokens. In some embodiment, the call routing system may direct the call with a short delay following receiving the set of call menu tokens, so that a human caller may perceive the routing as substantially instantaneous, for example, a total delay of less than one second. In some embodiments, a system configured to minimize latency, for example, by caching call intent logs, may achieve a total delay in the order of milliseconds or even microseconds. By causing the call routing system to direct the call substantially simultaneously with receiving the set of call menu tokens, a caller may have the experience of having a call routed in real time without needing to be placed on hold or directed to further IVR call options or menus. Thus, the call intent system 102 expands the abilities of IVR systems to automatically route calls in real time that would not be possible with previous methods.

In some embodiments, the call intent system 102 may cause the call routing system to automatically direct a caller to an inferred destination based on the most probable call intent. In some embodiments, the call routing system may first provide a confirmation prompt to the caller before automatically directing the call (for example, "you are now being routed to the accounts department to make a deposit, say YES to confirm").

In some embodiments, the scoring circuitry 210 may sort a set of scores comprising the total score for the candidate call intent to produce the ranked list of call intents. The communications hardware 206 may subsequently cause a call routing system to present the ranked list of call intents to a user. The ranked list of call intents may be sorted by the numerical total score corresponding to each call intent. The ranked list of call intents may be presented to the user in addition to or in place of the standard IVR menu. In some embodiments, the ranked list may provide a more convenient interface to the user, as the destinations corresponding to the most probable call intents are presented first, which the user may access without listening to the remainder of the call menu.

In some embodiments, the scoring circuitry 210 may update a global ranked list of call intents based on the set of scores, wherein the global ranked list of call intents is presented to new callers. The call intent system 102 may use aggregated data from all users to construct one or more global ranked lists of call intents, maintaining a list where the most globally popular intents are sorted to the top. In some embodiments, additional global ranked lists may be maintained in which each list is maintained for a particular cross-section of callers, such as geographic region, time of day, time of year, and/or the like. In some embodiments, the global ranked list may be used to automatically generate one or more IVR call menus that may be used in place of or in addition to the standard IVR call menus. For example, a large population of callers may frequently wish to access the ability to add a joint account holder to an existing account, which may be the last entry of an IVR call menu. The scoring circuitry 210 may aggregate call data indicating that a large frequency of calls with the intent to add joint account holders has occurred recently, and thus the add joint account holder intent may rise to the top of the globally ranked list of call intents. In response, the call intent system 102 may cause the call routing system to present routing destinations consistent with adding a joint account holder more prominently in IVR call menus.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with FIGS. 3-6 may be modified or further amplified. Furthermore, in some embodiments, additional optional operations may be included. Modifications, amplifications, or additions to the operations above may be performed in any order and in any combination.

CONCLUSION

As described above, example embodiments provide methods and apparatuses that enable improved call intent determination. Example embodiments thus provide tools that overcome the problems faced by call routing and interactive voice systems. Moreover, embodiments described herein avoid complex statistical or machine learning models, instead employing a lightweight model-free approach.

As these examples all illustrate, example embodiments contemplated herein provide technical solutions that solve real-world problems faced providing automated call center services. And while automated call routing and interactive voice response have been known in the art for some time, the demand for call center handling has continued to grow significantly, necessitating new innovations and solutions. Example embodiments described herein use a novel approach to determine call intents substantially in real time and thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for deriving call intent probability, the method comprising:

receiving, by communications hardware, a set of call menu tokens;

creating, by token circuitry, an n-gram from the set of call menu tokens, wherein the n-gram comprises a count and a corresponding call menu token;

receiving, by the communications hardware, an intent call log for a candidate call intent, wherein the intent call log comprises a frequency of the n-gram and a total frequency;

determining, by scoring circuitry, an n-gram intent score based on the frequency of the n-gram and the total frequency of the intent call log;

determining, by the scoring circuitry, a total score for the candidate call intent based on the n-gram intent score, wherein the total score provides a measure of a probability of the candidate call intent;

outputting, by the communications hardware, a ranked list of call intents comprising the total score and the candidate call intent;

selecting a most probable call intent from the ranked list of call intents; and causing a call routing system to direct a call using the most probable call intent, wherein the call corresponds to the set of call menu tokens, wherein causing the call routing system to direct the call occurs substantially simultaneously with receiving the set of call menu tokens.

2. The method of claim 1, wherein determining the n-gram intent score comprises:

determining, by the scoring circuitry, a relative frequency of the n-gram for the candidate call intent, wherein the relative frequency is based on the frequency of the n-gram and the total frequency;

determining, by the scoring circuitry, a count term for the n-gram based on the count of the n-gram; and calculating, by the scoring circuitry, the n-gram intent score based on the count term and the relative frequency.

3. The method of claim 1, wherein determining the total score comprises:

iteratively determining, by the scoring circuitry, a set of n-gram intent scores, wherein an iterated n-gram intent score in the set of n-gram intent scores corresponds to an iterated call menu token in the set of call menu tokens; and computing, by the scoring circuitry, a weighted sum of the set of n-gram intent scores and the n-gram intent score to determine the total score.

4. The method of claim 1, further comprising:

iteratively determining, by the scoring circuitry, a set of total scores, wherein an iterated total score in the set of total scores corresponds to an iterated call intent in a set of call intents.

5. The method of claim 4, wherein the ranked list of call intents further comprises the set of total scores and the set of call intents.

6. The method of claim 1, further comprising:

sorting, by the scoring circuitry, a set of scores comprising the total score for the candidate call intent to produce the ranked list of call intents; and causing a call routing system to present the ranked list of call intents to a user.

7. The method of claim 6, further comprising:

updating, by the scoring circuitry, a global ranked list of call intents based on the set of scores, wherein the global ranked list of call intents is presented to new callers.

8. The method of claim 1, wherein:

determining the n-gram intent score is performed without a parametric form for the intent score or a structural model for the intent score; and determining the total score is performed without a parametric form for the total score or a structural model for the intent score.

9. An apparatus for deriving call intent probability, the apparatus comprising:

communications hardware configured to receive a set of call menu tokens;

token circuitry configured to create an n-gram from the set of call menu tokens, wherein the n-gram comprises a count and a corresponding call menu token, wherein the communications hardware is further configured to receive an intent call log for a candidate call intent, wherein the intent call log comprises a frequency of the n-gram and a total frequency; and scoring circuitry configured to:

determine an n-gram intent score based on the frequency of the n-gram and the total frequency of the intent call log, and determine a total score for the candidate call intent based on the n-gram intent score, wherein the total score provides a measure of a probability of the candidate call intent, wherein the communications hardware is further configured to output a ranked list of call intents comprising the total score and the candidate call intent;

wherein the scoring circuitry is further configured to select a most probable call intent from the ranked list of call intents, wherein the communications hardware is further configured to cause a call routing system to direct a call using the most probable call intent, wherein the call corresponds to the set of call menu tokens, wherein causing the call routing system to direct the call occurs substantially simultaneously with receiving the set of call menu tokens.

10. The apparatus of claim 9, wherein the scoring circuitry is further configured so that determining the n-gram intent score comprises:

determining a relative frequency of the n-gram for the candidate call intent, wherein the relative frequency is based on the frequency of the n-gram and the total frequency;

determining a count term for the n-gram based on the count of the n-gram; and calculating the n-gram intent score based on the count term and the relative frequency.

11. The apparatus of claim 9, wherein the scoring circuitry is further configured so that determining the total score comprises:

iteratively determining a set of n-gram intent scores, wherein an iterated n-gram intent score in the set of n-gram intent scores corresponds to an iterated call menu token in the set of call menu tokens; and computing a weighted sum of the set of n-gram intent scores and the n-gram intent score to determine the total score.

12. The apparatus of claim 9, wherein the scoring circuitry is further configured to:

iteratively determine a set of total scores, wherein an iterated total score in the set of total scores corresponds to an iterated call intent in a set of call intents.

13. The apparatus of claim 12, wherein the ranked list of call intents further comprises the set of total scores and the set of call intents.

14. The apparatus of claim 9, wherein the scoring circuitry is further configured to:

sort a set of scores comprising the total score for the candidate call intent to produce the ranked list of call intents; and cause a call routing system to present the ranked list of call intents to a user.

15. The apparatus of claim 14, wherein the scoring circuitry is further configured to:

update a global ranked list of call intents based on the set of scores, wherein the global ranked list of call intents is presented to new callers.

16. A computer program product for deriving call intent probability, the computer program product comprising at least one non-transitory computer-readable storage medium storing software instructions that, when executed, cause an apparatus to:

receive a set of call menu tokens;

create an n-gram from the set of call menu tokens, wherein the n-gram comprises a count and a corresponding call menu token;

receive an intent call log for a candidate call intent, wherein the intent call log comprises a frequency of the n-gram and a total frequency;

determine an n-gram intent score based on the frequency of the n-gram and the total frequency of the intent call log;

determine a total score for the candidate call intent based on the n-gram intent score, wherein the total score provides a measure of a probability of the candidate call intent;

output a ranked list of call intents comprising the total score and the candidate call intent;

select a most probable call intent from the ranked list of call intents; and cause a call routing system to direct a call using the most probable call intent, wherein the call corresponds to the set of call menu tokens, wherein causing the call routing system to direct the call occurs substantially simultaneously with receiving the set of call menu tokens.

17. The computer program product of claim 16, wherein determining the n-gram intent score comprises:

determining a relative frequency of the n-gram for the candidate call intent, wherein the relative frequency is based on the frequency of the n-gram and the total frequency;

determining a count term for the n-gram based on the count of the n-gram; and calculating the n-gram intent score based on the count term and the relative frequency.

18. The computer program product of claim 16, wherein determining the total score comprises:

iteratively determining a set of n-gram intent scores, wherein an iterated n-gram intent score in the set of n-gram intent scores corresponds to an iterated call menu token in the set of call menu tokens; and computing a weighted sum of the set of n-gram intent scores and the n-gram intent score to determine the total score.

19. The computer program product of claim 16, wherein the software instructions, when executed, further cause the apparatus to:

iteratively determine a set of total scores, wherein an iterated total score in the set of total scores corresponds to an iterated call intent in a set of call intents.

20. The computer program product of claim 19, wherein the ranked list of call intents further comprises the set of total scores and the set of call intents.

* * * * *